US010488995B2

(12) United States Patent
Bobra et al.

(10) Patent No.: US 10,488,995 B2
(45) Date of Patent: Nov. 26, 2019

(54) SYSTEMS, DEVICES AND METHODS OF DETECTION OF USER INPUT

(71) Applicant: Google LLC, Mountain View, CA (US)

(72) Inventors: Neraj Paul Bobra, San Jose, CA (US); Timothy Golnik, San Francisco, CA (US); Tuan-Anh Tran, Burlingame, CA (US); Adam Mekeel Mack, Menlo Park, CA (US); Steven Diamond, San Francisco, CA (US); Matthew Ryan Montgomery, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 15/281,674

(22) Filed: Sep. 30, 2016

(65) Prior Publication Data

US 2017/0115771 A1    Apr. 27, 2017

Related U.S. Application Data

(60) Provisional application No. 62/235,472, filed on Sep. 30, 2015.

(51) Int. Cl.
*G06F 3/044* (2006.01)
*G06F 3/01* (2006.01)
(Continued)

(52) U.S. Cl.
CPC ............ *G06F 3/044* (2013.01); *G06F 1/1694* (2013.01); *G06F 3/017* (2013.01); *G06F 3/038* (2013.01);
(Continued)

(58) Field of Classification Search
USPC .................................................. 345/156, 168
See application file for complete search history.

(56) References Cited

U.S. PATENT DOCUMENTS 6,335,727 B1 *  1/2002  Morishita ........... G06F 3/03542
                                                        178/18.03
8,823,399 B1    9/2014  Bharathan
                    (Continued)

OTHER PUBLICATIONS

International Search Report and Written Opinion for International Application No. PCT/US2016/054745, dated Dec. 15, 2016, 8 pages.
(Continued)

*Primary Examiner* — Deeprose Subedi
(74) *Attorney, Agent, or Firm* — Shumaker & Sieffert, P.A.

(57) ABSTRACT

A method of detecting a user input includes sensing one or more touch events at a device. In some embodiments, a method includes sensing a first touch event via a first housing of a device. The method also includes generating a first detection signal based on the first touch event. The method also includes sensing a second touch event via a second housing of the device, the second housing conductively isolated from the first housing. The method also includes generating a second detection signal based on the second touch event. The method also includes classifying, based on the first detection signal and the second detection signal, the first touch event as user input. The method also includes identifying one or more actions based on the classification of the first touch event as the user input, the one or more actions associated with the user input.

15 Claims, 7 Drawing Sheets

(51) Int. Cl.
  *G06F 1/16* (2006.01)
  *G06F 3/038* (2013.01)
  *G06F 3/041* (2006.01)
(52) U.S. Cl.
  CPC .... *G06F 3/0416* (2013.01); *G06F 2200/1637* (2013.01); *G06F 2203/0381* (2013.01); *G06F 2203/04104* (2013.01); *G06F 2203/04106* (2013.01)

(56) References Cited

U.S. PATENT DOCUMENTS

| | | | | |
|---|---|---|---|---|
| 2009/0061928 | A1* | 3/2009 | Lee | G06F 3/0362 455/556.1 |
| 2011/0109546 | A1* | 5/2011 | Milne | G06F 1/1694 345/158 |
| 2011/0126094 | A1* | 5/2011 | Horodezky | G06F 3/04883 715/702 |
| 2012/0313880 | A1 | 12/2012 | Geaghan et al. | |
| 2013/0050202 | A1* | 2/2013 | Ueno | G06F 3/044 345/419 |
| 2014/0002422 | A1* | 1/2014 | Stern | G06F 3/03545 345/179 |
| 2014/0239984 | A1 | 8/2014 | Alameh et al. | |
| 2015/0004912 | A1 | 1/2015 | Diamond et al. | |
| 2015/0242009 | A1 | 8/2015 | Xiao et al. | |
| 2016/0162045 | A1* | 6/2016 | Vincent | G06F 3/0383 345/179 |

OTHER PUBLICATIONS

Extended Search Report from counterpart European Application No. 16852702.6, dated Mar. 6, 2019, 7 pp.

Response to Extended Search Report dated Mar. 6, 2019, from counterpart European Application No. 16852702.6, filed Sep. 19, 2019, 18 pp.

* cited by examiner

SYSTEMS, DEVICES AND METHODS OF DETECTION OF USER INPUT

CROSS-REFERENCE TO RELATED APPLICATIONS

This application claims priority to and the benefit of U.S. Provisional Application No. 62/235,472 entitled "SYSTEMS, DEVICES AND METHODS OF DETECTION OF USER INPUT," filed Sep. 30, 2015, the disclosure of which is incorporated herein by reference in its entirety.

This application is also related to U.S. Provisional Application No. 62/235,467 entitled "SYSTEMS, DEVICES AND METHODS OF USING A CONDUCTIVE CASING FOR A BATTERY CONTACT", filed on Sep. 30, 2015; to U.S. Provisional Application No. 62/235,526 entitled "METHODS AND APPARATUSES FOR SIMULATANEOUSLY EXCHANGING MESSAGES BETWEEN A LOW-ENERGY RADIO DEVICE AND MULTIPLE CENTRAL DEVICES", filed on Sep. 30, 2015; and to U.S. Provisional Application No. 62/235,469 entitled "SYSTEMS, DEVICES, AND METHODS OF MULTIPLEXED USE OF A CONDUCTIVE CASING", filed on Sep. 30, 2015.

BACKGROUND

Figure 1A:
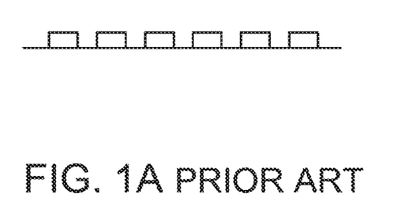
FIGS. 1A-1D illustrate capacitive, touch-sensitive interfaces, according to the prior art.
Figure 1B:
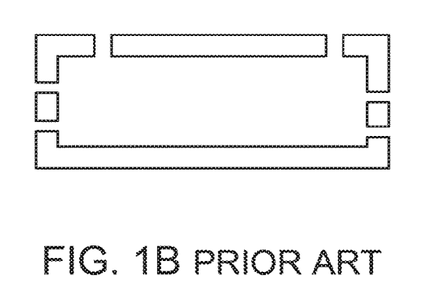
Figure 1C:
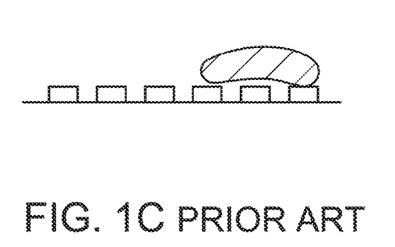
Figure 1D:
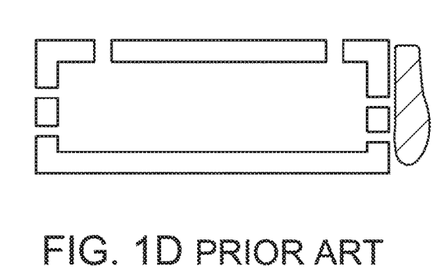

Capacitive sensing approaches find use in human interface devices, such as touchscreens. FIG. 1A illustrates a linear arrangement of capacitive elements (e.g., capacitive electrodes), such as in a touchscreen for example), and FIG. 1B illustrates an arrangement of capacitive elements to form an enclosure, such as, for example, a touch-sensitive casing for a device. Due to the numerosity of elements, such arrangements result in smaller capacitive elements, which in turn results in a small baseline capacitance. Further, as best illustrated in FIGS. 1C-1D, the linear (FIG. 1C) and the enclosed (FIG. 1D) arrangements are relatively robust against contamination, since typical particles that cause contamination, such as water and dirt, are unable to pass between the small spaces between elements.

Drawbacks of the arrangements illustrated in FIGS. 1A-1D, however include high power consumption due to the large number of capacitive elements. Further, costs of element and/or device fabrication are increased due to the large number of elements, and the intricacies associated therewith.

There is hence an unmet need to improve input detection while addressing the drawbacks laid out above, while maintaining detection sensitivity.

SUMMARY

Embodiments described herein relate generally to systems, devices, and methods for detection of user input. In some embodiments, a device includes a first housing configured to sense a first touch event and to generate a first detection signal based on the first touch event. The device also includes a second housing that is conductively isolated from the first housing. The second housing is configured to sense a second touch event and to generate a second detection signal based on the second touch event. The device also includes a processor communicatively coupled to the first housing and the second housing. In some embodiments, the processor is configured to classify the first touch event as user input based on the first detection signal and the second detection signal. In some embodiments, the processor is also configured to identify one or more actions based on the classification of the first touch event.

In some embodiments, a method includes sensing a first touch event via a first housing of a device. The method also includes generating a first detection signal based on the first touch event. The method also includes sensing a second touch event via a second housing of the device, the second housing conductively isolated from the first housing. The method also includes generating a second detection signal based on the second touch event. The method also includes classifying, based on the first detection signal and the second detection signal, the first touch event as user input. The method also includes identifying one or more actions based on the classification of the first touch event as the user input, the one or more actions associated with the user input.

In some embodiments, a non-transitory processor-readable medium stores code representing instructions to be executed by a processor. In some embodiments, the code includes code to cause the processor to sense a first touch event via a first housing of a device. The code also includes code to cause the processor to generate a first detection signal based on the first touch event. The code also includes code to cause the processor to sense a second touch event via a second housing of the device. The code further includes code to cause the processor to classify based on the first detection signal and the second detection signal, the first touch event as user input. The code also includes code to cause the processor to identify one or more actions based on the classification of the first touch event as the user input, the one or more actions associated with the user input.

DETAILED DESCRIPTION

As used in this specification, the singular forms "a," "an" and "the" include plural referents unless the context clearly dictates otherwise. Thus, for example, the term "a contact" is intended to mean a single contact or a plurality/combination of contacts.

In some embodiments, a device (also referred to as a "wearable device", or a "personal fitness device") includes a cover, casing, or a shell, and/or the like ("casing" hereon), that covers at least a portion of the device. In some embodiments, the casing, or at least a portion thereof, is substantially electrically conductive in nature. The casing can be constructed of any suitable, electrically conductive material such as stainless steel, aluminum, copper, conductive polymers, composites that include conductive additives (e.g., graphene), conductor-coated glass (e.g., with indium-tin-oxide, similar to capacitive touch screens), combinations thereof, and/or the like. In some embodiments, the casing can be associated with a electrically conductive component.

In some embodiments, the casing can include multiple conductive components, and further include insulating components in between the conductive components. In some embodiments, the casing includes at least two, at least three, at least four, at least five, at least six, at least seven, at least eight, at least nine, or at least ten, conductive components with at least one insulating component formed therebetween. For example, the casing can include dielectric material formed between two conducting portions.

Figure 2A:
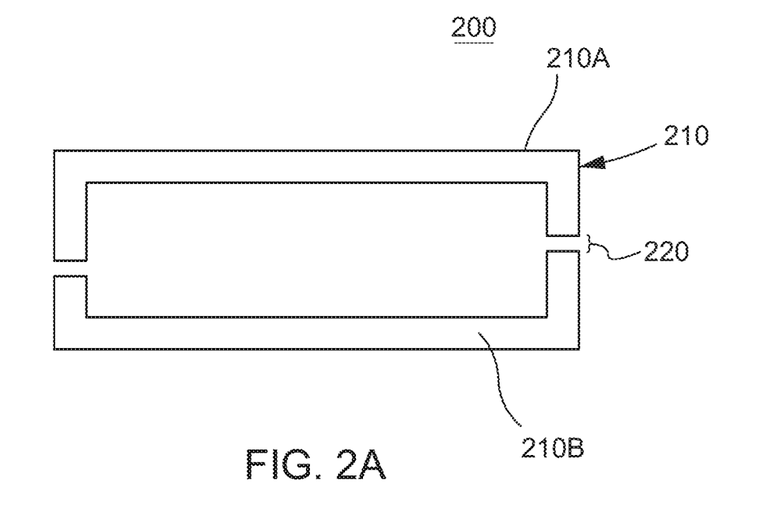
FIG. 2A illustrates a device with a conductive casing, according to an embodiment.
Figure 2B:
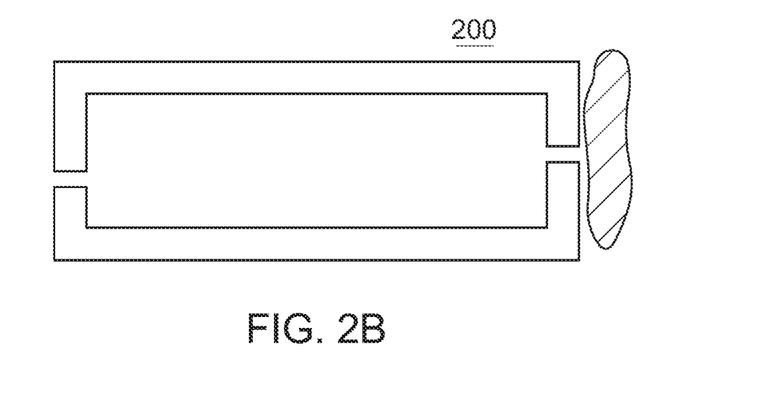
FIG. 2B illustrates prevention of contamination in the device of FIG. 2A.
Figure 2C:
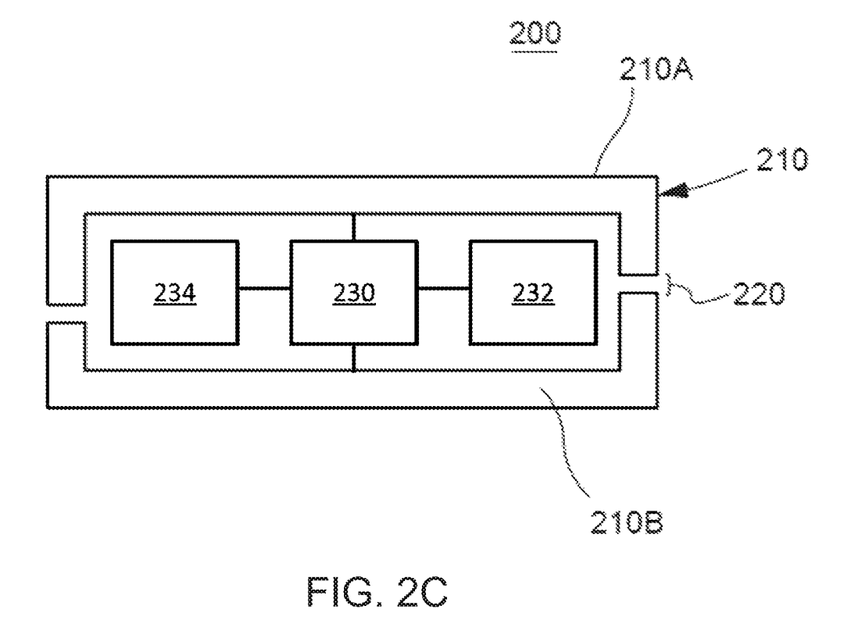
FIG. 2C illustrates various components of the device of FIG. 2A, according to an embodiment.

FIGS. 2A-2C illustrates a device 200, according to an embodiment. The device 200 includes an enclosure/casing 210 that includes a first conductive component (also sometimes referred to as a "first housing") 210A and a second conductive component (also sometimes referred to as a "second housing") 210B. An insulating component 220 formed between the conductive components 210A and 210B can include an insulating material such as, a suitable dielectric material. As best illustrated in FIG. 2B, the insulating component 220 may include a small gap, but the small gap is small enough to prevent common contaminants from permeating the device 200.

In some embodiments, the device 200 includes one or more input sensors (not shown) or interfaces for receiving input from a user. In some embodiments, the user input can include binary input, analog input, and/or combinations thereof. In some embodiments, the device can also include additional fitness sensors (not shown) for monitoring, tracking, and/or otherwise determining fitness parameters/data associated with a user. The device 200 can also include one or more storage media (not shown) for storing the user input and/or the fitness data, and one or more processors (not shown) for controlling operation of the device 200. The device 200 can also include one or more communication modules (not shown) for wirelessly communicating and/or otherwise transferring the user input and/or the fitness data, or information associated therewith, such as to a second device, for example. In some embodiments, the transfer of user input information can be done in real-time and/or continuously. In other words, the device 200 can acquire and transmit the user input in a substantially continuous manner. In some embodiments, the transfer of the fitness information can be done in real-time and/or continuously. In other words, the device 200 can acquire and transmit the fitness parameters in a continuous manner. In other embodiments, the fitness information can be transferred on a periodic basis, e.g., every few hours, or based on a user initiated syncing operation.

In some embodiments, at least a portion of the enclosure 210 includes one or more input sensors or interfaces for receiving input from a user. In some embodiments, user input can be received via the casing 210 in any suitable manner, such as, but not limited to, via tactile entry (e.g., using the first housing 210A as a button, or as a touch-sensitive screen/panel), via motion (e.g., rotating the first housing 210A), and combinations thereof. For example, in some embodiments, the first housing 210A includes a touch-sensitive capacitive interface that can receive user input via touch.

In some embodiments, the device 200 can be configured to detect user input based on one or more touch events received via the enclosure 210. User input can be characterized as any deliberate attempt on the part of a user to interact with the device 200, while a touch event can be deliberate (e.g., the user presses down on the first conductive component 210A with his finger) or inadvertent (e.g., the user brushes against the first conductive component 210A with his arm). In this manner, and as further detailed below, the device 200 can be configured to detect/classify deliberate touch events as user input, and can be further configured to classify inadvertent touch events as not providing meaningful user input.

In some embodiments, the device 200 can be configured to receive/detect touch events at one or more of the housings 210A, 210B as user input. For example, if the device 200 is worn such that the conductive component 210B is in substantial contact with the skin of the user, the conductive component 210A can be configured to receive touch events, such as when the user touches or presses down on the conductive component 210A with his finger.

The touch event can be detected in any suitable manner. In some embodiments, the device 200 can be configured to determine that a touch event has occurred based on pre-specified criterion such as, but not limited to, a minimum duration of contact between the user and the first housing 210A, a minimum number of contacts between the user and the first housing 210A (e.g., a single "tap", multiple taps, and/or the like), a measure of degree associated with the contact between the user and the conductive component 210A (e.g., a "half tap" vs. a "full tap"), electro-magnetic field strength of capacitance, and combinations thereof.

In some embodiments, the device 200 can be configured to detect user input based on touch events at one of the housings 210A, 210B (e.g., say the first housing 210A, for simplicity), and further based on one or more additional events. The additional event(s) can be monitored, detected and/or otherwise received in any suitable manner, such as via one or more input sensors on the device 200, via the other conductive component (e.g., here, the conductive component 210B), via a signal from an external device (e.g., from another device/sensor), and/or the like.

In some embodiments, the additional event(s) can be based on signals from one or more input sensors associated with the device 200. The one or more input sensors can include, but are not limited to, one or more of an audio receiver (e.g., a microphone), a button, a keypad, a dial, a touchscreen, electrical sensors, conductance sensors, accelerometers, magnetometers, gyroscopes, capacitive sensors, optical sensors, cameras, global positioning system (GPS) sensors combinations thereof, and/or the like.

In some embodiments, the one or more input sensors include at least an accelerometer associated with the device 200. In such embodiments, the device 200 can be configured to determine that user input has been received when a) a touch event is detected at the first housing 210A, and b) when a signal from the accelerometer meets a pre-specified criterion, such as a minimum signal value/acceleration, when the signal is received within a pre-specified time period, combinations thereof, and/or the like. In this manner, false positives associated with detection of user input can be avoided, since the combination of a touch event and acceleration results in a relatively higher probability of user input, vs. a touch event alone, or vs. acceleration alone.

In some embodiments, the additional event includes touch detection via the second housing 210B. Said another way, each of the housings 210A, 210B provides touch events that can be analyzed by the device 200 to determine if user input has been received. As an example, if the device 200 is worn on a wrist of the user and the second housing 210B interfaces the skin of the user's wrist, the combination of touch detection via the second housing 210B (by virtue of contact with the user's wrist) and touch detection via the first housing 210A (e.g., by the user touching the first housing 210A with his finger) can be employed to determine if user input has been likely received. In some embodiments, the second housing 210B can be configured to detect any suitable electrical measure upon touch detection including, but not limited to, current, voltage, capacitance, resistance, conductance, reactance, inductance, combinations thereof, absolute value(s) thereof, and/or the like. The touch event at the second housing 210B can be detected in any suitable manner. In some embodiments, the device 200 can be configured to determine that a touch event has occurred at the second housing 210B based on pre-specified criterion such as, but not limited to, a minimum duration of contact between the user and the second housing 210B (e.g., at least 5 seconds), a minimum number of contacts between the user and the second housing 210B, a measure of degree associated with the contact between the user and the second housing 210B, and combinations thereof. In some embodiments, the additional event is a measure of capacitance/change in capacitance at the second housing 210B. In some embodiments, the additional event is a measure of resistance/change in resistance at the second housing 210B.

In some embodiments, the additional event is touch detection at the second housing 210B, and the device 200 is configured to analyze the electrical measure provided by the second housing 210B (e.g., the capacitance/absolute value in capacitance) to determine the nature of the touch event. For example, device 200 can analyze the intensity, spectrum, duration, and/or other features of the electrical measure to classify the touch detection as being due to the user, due to dirt, due to water, and/or the like. In some embodiments, the device 200 is configured to analyze the variance of the electrical measure and, if the variance meets a pre-specified criterion (e.g., a minimum threshold value), the device 200 can deem that a touch event occurred.

In some embodiments, the device 200 is configured to, for controlling against false touch detection, increase resolution for the detection of the electrical measure such as, for example, from 8 bits to 16 bits. In some embodiments, the device 200 is configured to, for controlling against false touch detection, increase a sampling rate associated with the electrical measure. For example, the sampling rate can be increased to about 100 Hz from a value below 100 Hz, or to any suitable sampling value.

In some embodiments, the device 200 can take one or more actions based on the classification of the touch detection such as, for example, notifying the user (via an interface of the device 200) if the electrical measure is classified as detection of dirt). In some embodiments, the device 200 can be configured to modify classification criterion based on the electrical measure. For example, if the electrical measure persistently indicates that dirt is being detected, the device 200 can be configured to adjust a threshold for touch detection to be relatively higher, to prevent false positives. As another example, if the electrical measure persistently indicates that water is being detected, the device 200 can be configured to not apply the input from the second housing 210B towards determination of user input until the water is removed and the electrical output from the second housing 210B changes.

Irrespective of the nature of the additional event, the touch event and the additional event can be combined in any suitable manner to determine whether user input has been received. In some embodiments, the device 200 can be configured to detect a touch event first, and subsequently determine if the additional event is present. Said another way, the touch event can be the trigger to determining whether user input has been received. In some embodiments, the device 200 can be configured to receive the additional event first (e.g., a signal from an accelerometer), and subsequently determine if a touch event is present. In this embodiment, it is the additional event that is the trigger to determining whether user input has been received. For example, once acceleration is detected, the device 200 can be configured to check if the user also tapped on the device; if so, it is determined that user input has been received; otherwise, no user input is registered.

In some embodiments, the touch event and the additional event can be received/analyzed substantially simultaneously. In some embodiments, the signals from the touch event and the additional event can be combined in any suitable manner to determine if user input has been received, including, but not limited to, simple arithmetic, weighted combination, non-linear combination, probabilistic approaches, combinations thereof, and/or the like. For example, in embodiments where the touch event and the additional event are both capacitance based, the device 200 can be configured to determine that user input has been received if the difference between the capacitance of the touch event and the capacitance of the additional event meets a predetermined threshold.

While described here with reference to a single touch event and an additional event for simplicity of explanation, it is understood that a multiplicity of additional events may be combined with the touch event to determine user input, and are within the scope of the devices and methods disclosed herein. Any of the additional event(s) can be touch events, as well. For example, the device 200 can be configured for determination of user input based on a) touch detection at the second housing 210A, b) touch detection at the second housing 210B, and c) detection of acceleration at an accelerometer of the device 200.

In some embodiments, the device 200 can be structurally and/or functionally similar to the device as generally described in U.S. patent application Ser. No. 14/881,677 ("the '677 application") titled "SYSTEMS, DEVICES, AND METHODS FOR DYNAMIC CONTROL", filed Oct. 13, 2015, the entire disclosure of which is incorporated herein by reference in its entirety. In some embodiments, the device is configured for proximity based data transfer of fitness data to another device, as disclosed in U.S. patent application Ser. No. 14/309,195 ("the '195 application") titled "SYSTEMS AND METHODS FOR DATA TRANSFER", filed Jun. 19, 2014, the entire disclosure of which is incorporated herein by reference in its entirety.

As best illustrated in FIG. 2C, the device 200 includes a processor 230 coupled to the first housing 210A and the second housing 210B, according to an embodiment. In some embodiments, the device 200 also includes a memory 232 and a communication component 234 coupled to the processor 230. Optionally, in some embodiments, the device 200 can include additional components, such as analog/digital circuits, digital/analog circuits and multiplexers, etc.

In some embodiments, the processor 230 can be configured to analyze the one or more touch events received at the first housing 210A and/or the second housing 210B to determine if user input has been received. For example, when the device 200 is worn on a wrist of the user and the second housing 210B interfaces the skin of the user's wrist, the processor 230 can be configured to determine that a touch event has occurred at the second housing 210B based on pre-specified criterion such as, but not limited to, a minimum duration of contact between the user and the second housing 210B (e.g., at least 5 seconds or at least 2 seconds), a minimum number of contacts between the user and the second housing 210B, a measure of degree associated with the contact between the user and the second housing 210B, and combinations thereof. In some embodiments, the processor 230 can be configured to analyze additional events via a measure of capacitance/change in capacitance at the second housing 210B. In some embodiments, the processor 230 can be configured to analyze one or more additional events via a measure of resistance/change in resistance at the second housing 210B.

In some embodiments, the processor 230 can store in the memory 232 any or all of the information regarding any, some or all of the touch events received via either of the first housing 210A or second housing 210B, or both. In some embodiments, the memory 232 can store the times and durations of the touch events received at either of the first housing 210A or second housing 210B, or both. In some embodiments, the memory 232 can store the information for a predetermined period of time. In some embodiments, the memory 232 can store the information for a predetermined period of time before being replaced by new information, such as being overwritten by newly acquired fitness data and/or touch information, for example. In some embodiments, the stored information or data in the memory 232 can be transmitted via the communication component 234.

In some embodiments, the device 200 can be in communication with other devices via the communication component 234 and/or via a network. The communication component 234 can be any suitable means for wireless communication between the device and other devices, including capacitive, magnetic, optical, acoustic, and/or the like. The communication component 234 can include bidirectional communication and, in some embodiments, any or all communications may be secured (e.g., encrypted) or unsecured, as suitable and as is known in the art.

Some embodiments described herein can relate to a kit including the device 200. In some embodiments, the kit can include one or more holders for the device 200. As an example, a kit can include the device 200, and further include one or more accessories for holding the device such as a necklace, a wrist strap, a belt, a clip, a clasp, and/or the like.

Figure 3A:
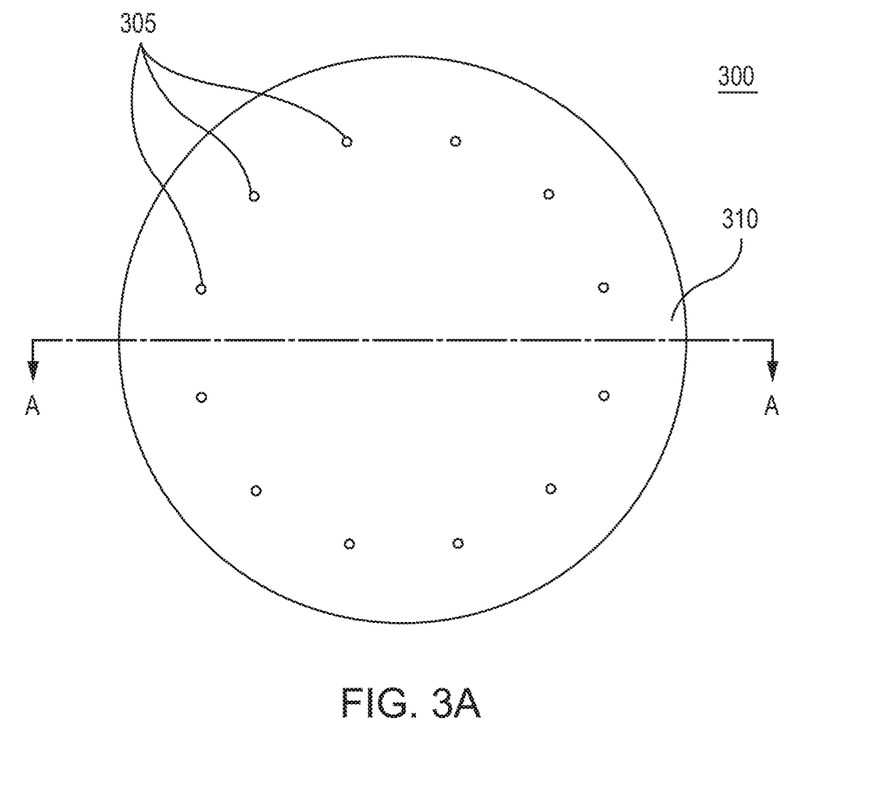
FIG. 3A shows a top view of an example device with a conductive housing, according to an embodiment.

As shown in FIG. 3A, a device 300, which can be similar to the device 200, includes a conductive housing 310 with multiple indicators 305. In some embodiments, the device 300 can include one or more indicators 305. In some embodiments, the device 300 can include any number of indicators 305, including 1, 2, 3, 4, 5, 6, 7, 8, 9, 10, 11, 12, or more indicators 305.

In some embodiments, the housing 310 of the device 300 can be a circular housing, and can be structurally and/or functionally similar to the first housing 210A and/or the second housing 210B. In some embodiments, the conductive housing 310 of the device 300 can be in any shape or form factor, including rectangular, square, triangular, or in any angular shape with any number of facets. In some embodiments, the conductive housing 310 of the device 300 can include two conductive housings.

Figure 3B:
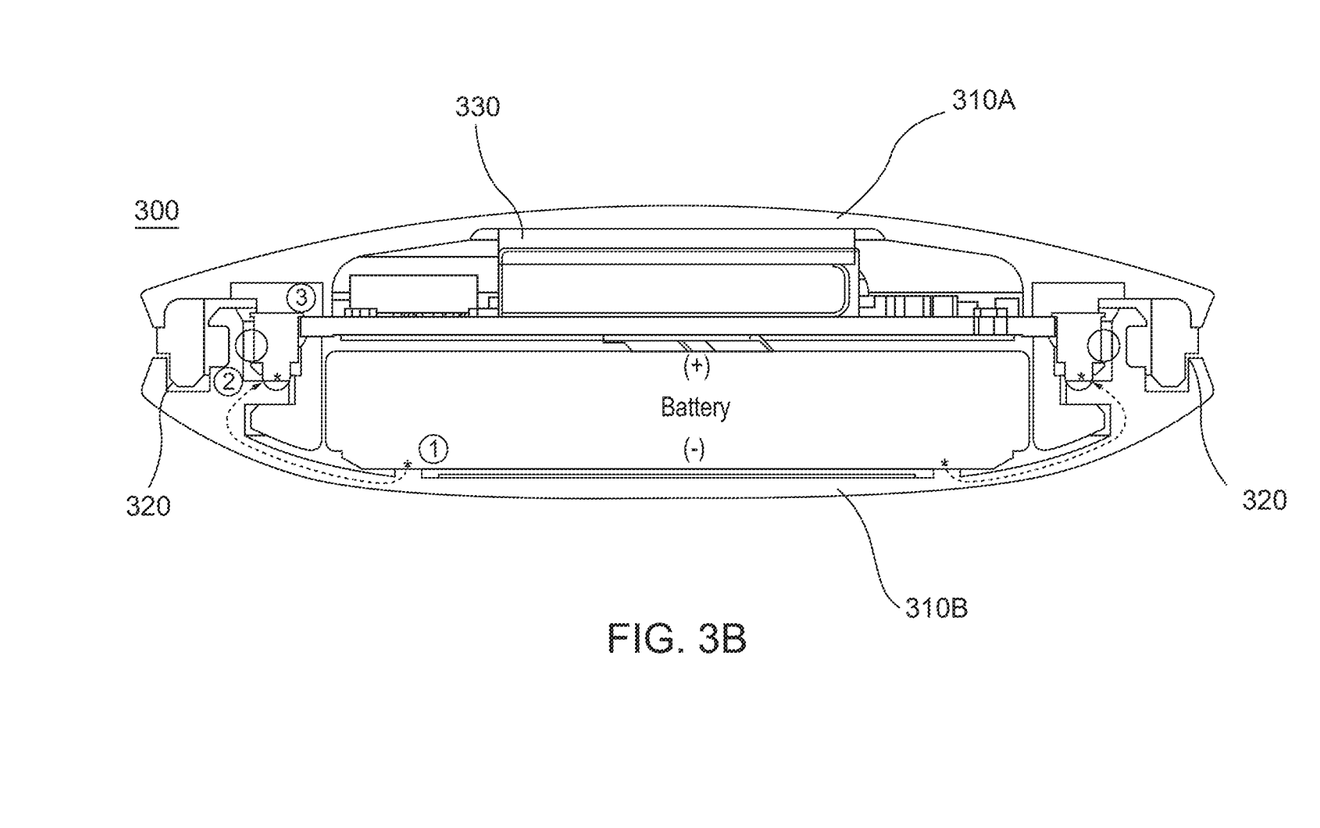
FIG. 3B shows a cross-sectional view of the device along the A-A line as shown in FIG. 3A.

FIG. 3B shows a cross-sectional view along the A-A line of the device 300 in FIG. 3A. In some embodiments, as shown in FIG. 3B, the device 300 includes a first housing 310A, the first housing configured to sense a first touch event and to generate a first detection signal based on the first touch event. The device also includes a second housing 310B that is conductively isolated from the first housing. The second housing is configured to sense a second touch event and to generate a second detection signal based on the second touch event. The device also includes a processor 330 communicatively coupled to the first housing and the second housing. In some embodiments, the processor 330 is configured to classify the first touch event as user input based on the first detection signal and the second detection signal. In some embodiments, the processor 330 is also configured to identify one or more actions based on the classification of the first touch event.

In some embodiments, the device 300 can take one or more actions based on the classification of the touch detection such as, for example, notifying the user (via an interface of the device 300 if the electrical measure is classified as detection of dirt). In some embodiments, the device 300 can be configured to modify classification criterion based on the electrical measure. For example, if the electrical measure persistently indicates that dirt is being detected, the device 300 can be configured to adjust a threshold for touch detection to be relatively higher, to prevent false positives. As another example, if the electrical measure persistently indicates that water is being detected, the device 300 can be configured to not apply the input from the conductive component 310B towards determination of user input until the water is removed and the electrical output from the conductive component 210B changes.

Irrespective of the nature of the additional event, the touch event and the additional event can be combined in any suitable manner to determine whether user input has been received. In some embodiments, the device 300 can be configured to detect a touch event first, and subsequently determine if the additional event is present. Said another way, the touch event can be the trigger to determining whether user input has been received. In some embodiments, the device 300 can be configured to receive the additional event first (e.g., a signal from an accelerometer), and subsequently determine if a touch event is present. In this embodiment, it is the additional event that is the trigger to determining whether user input has been received. For example, once acceleration is detected, the device 300 can be configured to check if the user also tapped on the device; if so, it is determined that user input has been received; otherwise, no user input is registered.

In some embodiments, the touch event and the additional event can be received/analyzed substantially simultaneously. In some embodiments, the signals from the touch event and the additional event can be combined in any suitable manner to determine if user input has been received, including, but not limited to, simple arithmetic, weighted combination, non-linear combination, probabilistic approaches, combinations thereof, and/or the like. For example, in embodiments where the touch event and the additional event are both capacitance based, the device 300 can be configured to determine that user input has been received if the difference between the capacitance of the touch event and the capacitance of the additional event meets a predetermined threshold.

While described here with reference to a single touch event and an additional event for simplicity of explanation, it is understood that a multiplicity of additional events may be combined with the touch event to determine user input, and are within the scope of the devices and methods disclosed herein. Any of the additional event(s) can be touch events, as well. For example, the device 300 can be configured for determination of user input based on a) touch detection at the conducting component 310A, b) touch detection at the conducting component 310B, and c) detection of acceleration at an accelerometer of the device 300.

In some embodiments, the isolation between the first housing 310A and the second housing 310B can include one or more insulating component 320 formed there between. In some embodiments, the isolation between the first housing 310A and the second housing 310B can include an insulating component, such as, for example, a suitable dielectric material. As best illustrated in FIG. 3B, the insulating component 320 can also include a gap, but the gap is small enough to prevent common contaminants from permeating the device 300. In some embodiments, the gap can be about 5 mm, about 4 mm, about 3 mm, about 2 mm, about 1 mm, about 0.5 mm, less than 0.55 mm, including all values and subranges in between.

In some embodiments, the device 300 includes the first housing 310A including a first capacitive sensor and the second housing including a second capacitive sensor, the second capacitive sensor being conductively isolated from the first capacitive sensor.

In some embodiments, the device 300 includes at least one of the first housing and the second housing receiving a user input via a tactile interface.

In some embodiments, the device 300 includes at least one of the first housing and the second housing receiving the user input via a rotating component configured to receive the user input via rotation of the rotating component. In some embodiments, user input can be received via at least one of the first housing and the second housing in any suitable manner, such as, but not limited to, via tactile entry (e.g., using the at least one of the first housing and the second housing as a button, or as a touch-sensitive screen/panel), via motion (e.g., rotating at least one of the first housing and the second housing), and combinations thereof. For example, in some embodiments, the at least one of the first housing and the second housing includes a touch-sensitive capacitive interface that can receive user input via touch.

In some embodiments, the device 300 includes the first housing receiving the first touch event as user input when the first detection signal includes an indication of the first touch event being received at a first time and the second detection signal includes an indication of the second touch event is received at a second time, the second time being substantially the same as the first time.

In some embodiments, the device 300 includes the first housing receiving the first touch event as user input when the first detection signal includes an indication of the first touch event being received at a first time and the second detection signal includes an indication of the second touch event is received at a second time, the second time being within a predetermined duration of the first time. In some embodiments, the predetermined duration between the first time and the second time is about 0.5 seconds, about 0.7 s, about 0.9 s, about 1 s, about 2 seconds, about 3 seconds, about 5 seconds, including all values and subranges in between.

In some embodiments, the device 300 includes at least one of the first housing and the second housing receives a third touch event to generate a third detection signal based on the third touch event.

In some embodiments, the device 300 includes the first housing receiving the first touch event as user input when the first detection signal includes an indication of the first touch event being received at a first time, the second detection signal includes an indication of the second touch event being received at a second time, and the third detection signal includes an indication of the third touch event being received at a third time, the third time being within a predetermined duration of the second time. In some embodiments, the predetermined duration between the second time and the third time is about 0.5 seconds, about 0.7 s, about 0.9 s, about 1 s, about 2 seconds, about 3 seconds, about 5 seconds, including all values and subranges in between.

In some embodiments, the device 300 further includes an accelerometer to provide information including position, speed or acceleration of the device, wherein the processor 330 determines a touch event as a user input using the information provided by the accelerometer.

Figure 4:
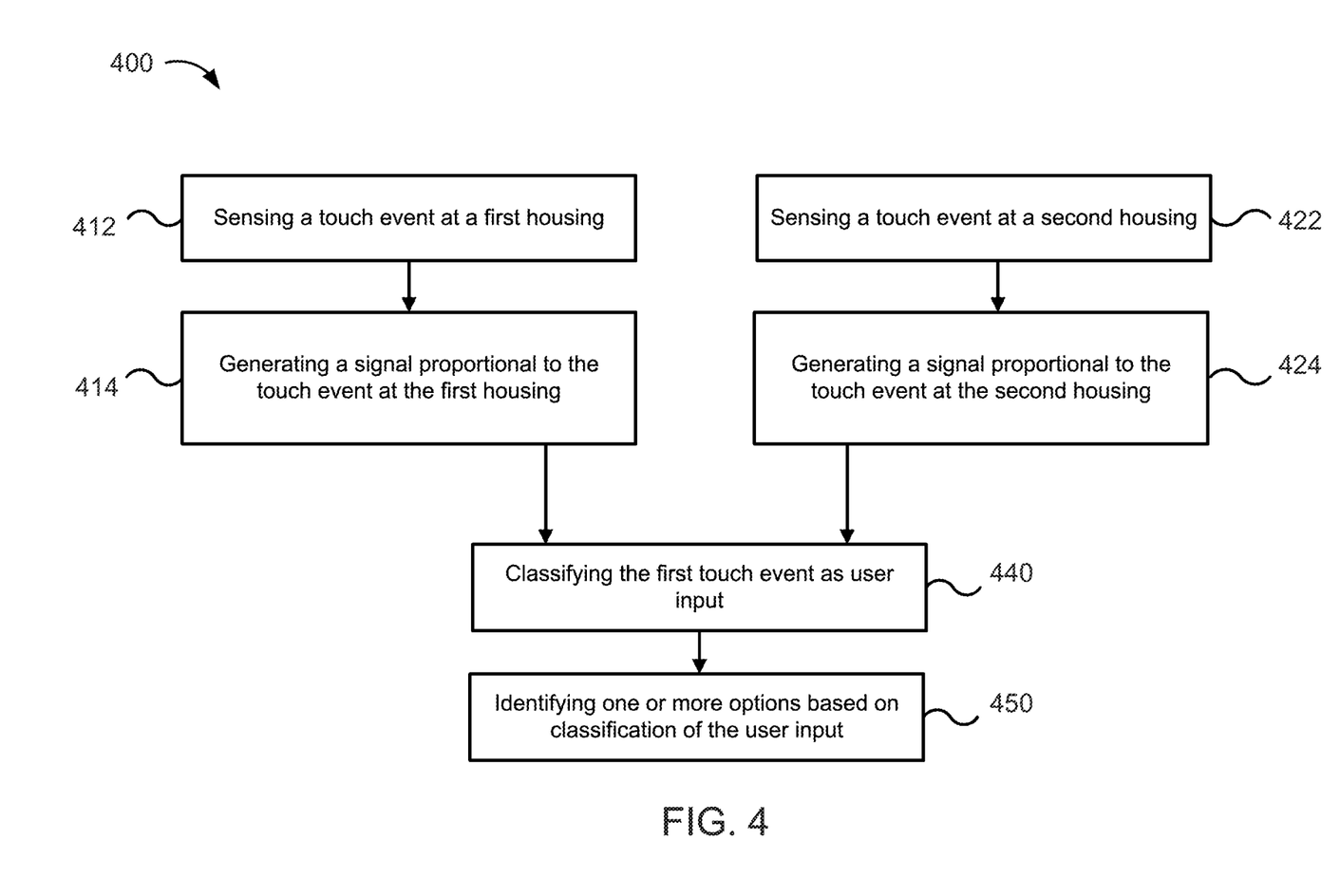
FIG. 4 shows an example method for receiving a user input, according to an embodiment.

In some embodiments, a method 400 as described in FIG. 4 is usable with a device and/or executable at least in part by a device, such as the device 200 and/or 300 as described herein. The method 400 includes sensing a first touch event via a first housing of the device at step 412. The method 400 also includes generating a first detection signal based on the first touch event at step 414. The method 400 also includes sensing a second touch event via a second housing of the device at step 422, the second housing conductively isolated from the first housing. The method 400 also includes generating a second detection signal based on the second touch event at step 424. The method 400 also includes classifying, at step 440, based on the first detection signal and the second detection signal, the first touch event as user input. The method also includes identifying one or more actions based on the classification of the first touch event as the user input, the one or more actions associated with the user input at step 450.

In some embodiments, the method 400 includes classifying the first touch event as user input when the first detection signal includes an indication of the first touch event being received at a first time and the second detection signal includes an indication of the second touch event is received at a second time, the second time being substantially the same as the first time. Said another way, the steps 412, 414 can occur substantially simultaneously with the steps 422, 424, or in a substantially overlapping manner. For example, in some embodiments, the first touch event and the second touch event can be said to occur at substantially the same time when the first touch event occurs within about 1 second, about 0.5 s, about 0.4 s, about 0.2 s, about 0.1 s, less than about 0.1 s, including all values and subranges in between.

In some embodiments, the method 400 includes classifying the first touch event as user input when the first detection signal includes an indication of the first touch event being received at a first time and the second detection signal includes an indication of the second touch event being received at a second time. The second time can be within a predetermined duration of the first time.

In some embodiments, the method 400 further includes sensing a third touch event via one of the first housing or the second housing; and generating a third detection signal based on the third touch event.

In some embodiments, the method 400 includes classifying the first touch event as user input when the first detection signal includes an indication of the first touch event being received at a first time, the second detection signal includes an indication of the second touch event being received at a second time, and the third detection signal includes an indication of the third touch event being received at a third time, the third time being within a predetermined duration of the second time. In some embodiments, the second time is substantially the same as the first time.

In some embodiments, the method 400 includes classifying the first touch event as user input when the first detection signal includes an indication of user input and the second detection signal includes an indication of contact between the second housing and a user of the device for a predetermined duration.

In some embodiments, the method 400 includes classifying the user input by identifying the first touch event as a skin contact, the second touch event and the third touch event as the user input.

In some embodiments, the method 400 further includes sensing a fourth touch event via one of the first housing at process 410 or the second housing at process 420, and generating a fourth detection signal based on the fourth touch event.

In some embodiments, the total number of touch events can be configured to perform a certain function of the device. For example, the first touch event can be configured to "wake-up" the device and the second touch event can be configured to acquire the time of day. Said another way, a double-touch event can be used configure to acquire the time of day. In some embodiments, the third touch event can be configured (e.g. a triple touch event) to acquire the duration of the walk or the fourth touch event (e.g., a quadruple touch event) can be configured to reset the duration of the walk. In some embodiments, any number of touch events or duration or timing of the individual or combined touch events can be configured to perform any feature or any combination of the features.

In some embodiments, the method 400 includes classifying the first touch event as user input when the first detection signal includes an indication of the first touch event being received at a first time, the second detection signal includes an indication of the second touch event being received at a second time, the third detection signal includes an indication of the third touch event being received at a third time, and the fourth detection signal includes an indication of the fourth touch event being received at a fourth time, the fourth time being within a predetermined duration of the third time.

In some embodiments, the method 400 includes classifying the user input includes identifying the first touch event as a skin contact, the second touch event, the third touch event, and the fourth touch event as the user input.

In some embodiments, the method 400 further includes presenting an indication at step 450 of the one or more actions associated with the user input to a user of the device.

Figure 5:
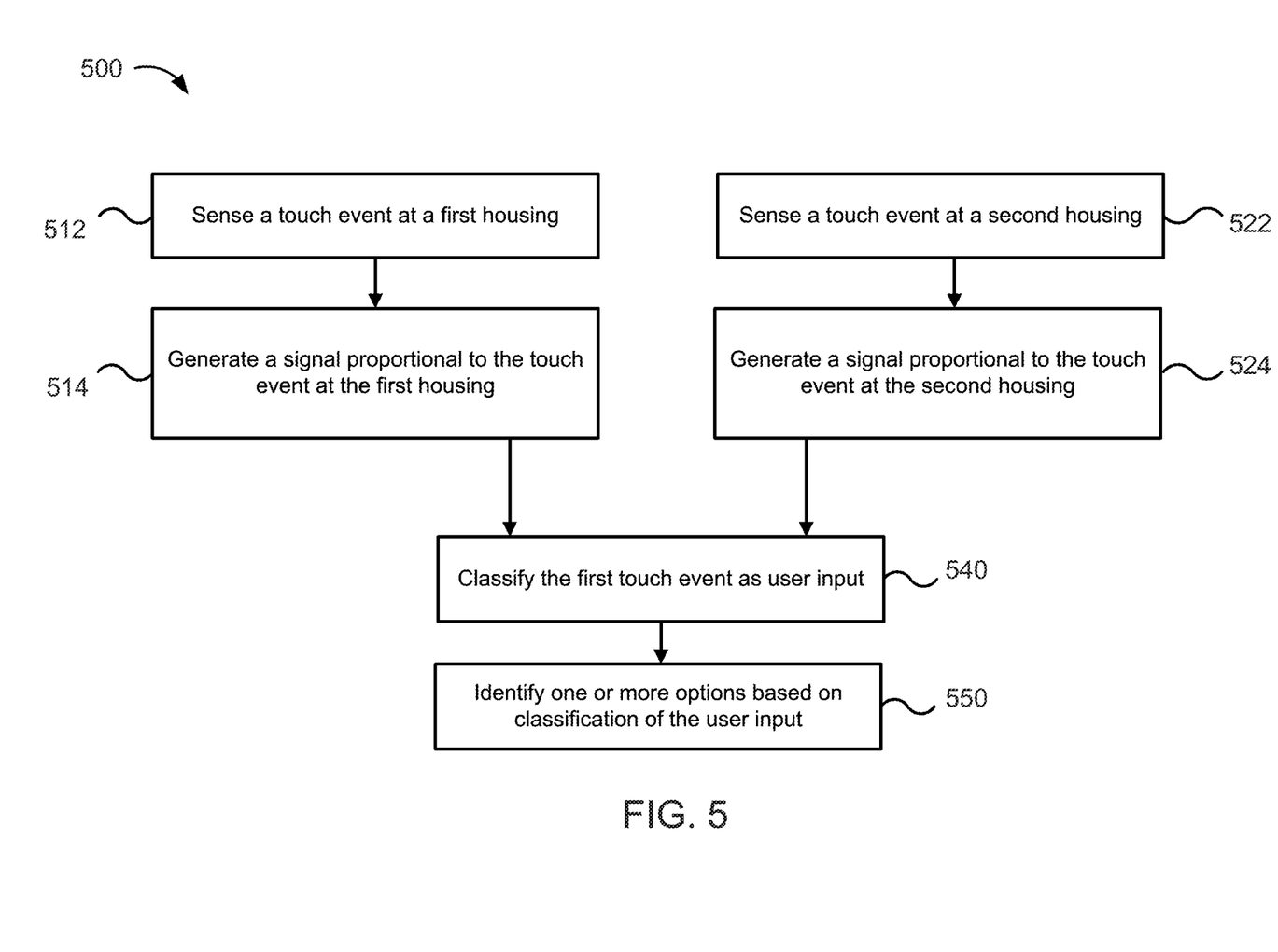
FIG. 5 shows an example method for receiving a user input, according to another embodiment.

In some embodiments, a non-transitory processor-readable medium storing code representing instructions 500 to be executed by a processor, such as a processor 230 as described with respect to FIG. 2C, the code comprises code to cause the processor to sense a first touch event via a first housing of a device at step 512. In some embodiments, the code comprises code to cause the processor to generate a first detection signal based on the first touch event at step 514. In some embodiments, the code comprises code to cause the processor to sense a second touch event via a second housing of the device at step 522, with the second housing being conductively isolated from the first housing. In some embodiments, the code comprises code to cause the processor to generate a second detection signal based on the second touch event at step 524. In some embodiments, the code comprises code to cause the processor to classify at step 540, based on the first detection signal and the second detection signal, the first touch event as user input. In some embodiments, the code comprises code to cause the processor to identify at step 550, one or more actions based on the classification of the first touch event as the user input, the one or more actions associated with the user input.

In some embodiments, the code 500 further comprises code to cause the processor to classify, the first touch event as user input when the first detection signal includes an indication of the first touch event being received at a first time and the second detection signal includes an indication of the second touch event is received at a second time, the second time being substantially the same as the first time. Said another way, the steps 512, 514 can occur substantially simultaneously with the steps 522, 524 or in a substantially overlapping manner.

In some embodiments, the code 500 further comprises code to cause the processor to classify, the first touch event as user input when the first detection signal includes an indication of the first touch event being received at a first time and the second detection signal includes an indication of the second touch event being received at a second time, the second time being within a predetermined duration of the first time.

In some embodiments, the code 500 further comprises code to cause the processor to sense a third touch event via one of the first housing or the second housing; and generate a third detection signal based on the third touch event.

In some embodiments, the code 500 further comprises code to cause the processor to classify, the first touch event as user input when the first detection signal includes an indication of the first touch event being received at a first time, the second detection signal includes an indication of the second touch event being received at a second time, and the third detection signal includes an indication of the third touch event being received at a third time, the third time being within a predetermined duration of the second time.

In some embodiments, the second time is substantially the same as the first time.

In some embodiments, the code 500 further comprises code to cause the processor to classify, the first touch event as user input when the first detection signal includes an indication of user input and the second detection signal includes an indication of contact between the second housing and a user of the device for a predetermined duration.

In some embodiments, the code 500 further comprises code to cause the processor to identify the first touch event as a skin contact, the second touch event and the third touch event as the user input.

In some embodiments, the code 500 further comprises code to cause the processor to sense a fourth touch event via one of the first housing or the second housing; and generate a fourth detection signal based on the fourth touch event.

In some embodiments, the code 500 further comprises code to cause the processor 530 to classify, the first touch event as user input when the first detection signal includes an indication of the first touch event being received at a first time, the second detection signal includes an indication of the second touch event being received at a second time, the third detection signal includes an indication of the third touch event being received at a third time, and the fourth detection signal includes an indication of the fourth touch event being received at a fourth time, the fourth time being within a predetermined duration of the third time.

In some embodiments, the code 500 further comprises code to cause the processor to identify the first touch event as a skin contact, the second touch event, the third touch event, and the fourth touch event as the user input.

In some embodiments, the code 500 further comprises code to cause the processor to present an indication of the one or more actions associated with the user input to a user of the device.

Some embodiments described herein relate to a computer storage product with a non-transitory computer-readable medium (also referred to as a non-transitory processor-readable medium) having instructions or computer code thereon for performing various computer-implemented operations. The computer-readable medium (or processor-readable medium) is non-transitory in the sense that it does not include transitory propagating signals (e.g., a propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: flash memory, magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages and/or other development tools.

Where methods and/or schematics described above indicate certain events and/or flow patterns occurring in certain order, the ordering of certain events and/or flow patterns may be modified. Additionally certain events may be performed concurrently in parallel processes when possible, as well as performed sequentially.

The invention claimed is:

1. A method, comprising:
   detecting, by a first housing of a wearable device, a first touch event;
   generating, based on the first touch event, a first detection signal that includes an indication of the first touch event being received at a first time;
   detecting, by a second housing of the wearable device, a second touch event, the second housing conductively isolated from the first housing;
   generating, based on the second touch event, a second detection signal that includes an indication of the second touch event being received at a second time;
   classifying, based on the first detection signal and the second detection signal, the first touch event as one of user input or inadvertent touch input, wherein the first touch event is classified as the user input in response to determining that the second time is within a predetermined duration of the first time;
   responsive to classifying the first touch event as the user input, identifying, based on the user input, one or more actions associated with the user input; and
   responsive to classifying the first touch event as the inadvertent touch input, discarding the first touch event.

2. The method of claim 1, further comprising:
   detecting, by one of the first housing or the second housing, a third touch event; and
   generating a third detection signal based on the third touch event.

3. The method of claim 2,
   wherein the predetermined duration of time is a first determined duration of time,
   wherein the third detection signal includes an indication of the third touch event being received at a third time, and
   wherein the first touch event is classified as the user input further in response to determining that the third time is within a second predetermined duration of the second time.

4. The method of claim 1, wherein the first touch event is classified as a user input further in response to determining that the second detection signal includes an indication of contact between the second housing and a user of the device for at least a predetermined duration of time.

5. The method of claim 1, further comprising:
   performing, by the device, at least one of the one or more actions associated with the user input.

6. A wearable device, comprising:
   a first housing, the first housing configured to detect a first touch event and to generate a first detection signal based on the first touch event;
   a second housing, the second housing conductively isolated from the first housing, the second housing configured to detect a second touch event and to generate a second detection signal based on the second touch event; and
   a processor communicatively coupled to the first housing and the second housing, the processor configured to:
      classify, based on the first detection signal and the second detection signal, the first touch event as one of user input or inadvertent touch input in response to determining that a time at which the second housing detected the second touch event is within a predetermined amount of time of a time at which the first housing detected the first touch event;
      responsive to classifying the first touch event as user input, identify one or more actions based on the classification of the first touch event; and
      responsive to classifying the first touch event as the inadvertent touch input, discard the first touch event.

7. The wearable device of claim 6, wherein the first housing includes a first capacitive sensor and the second housing includes a second capacitive sensor, the second capacitive sensor conductively isolated from the first capacitive sensor.

8. The wearable device of claim 6, wherein at least one of the first housing receives the first touch event or the second housing receives the second touch event via a rotating component configured to receive the first touch event or the second touch event via rotation of the rotating component.

9. The wearable device of claim 6, wherein at least one of the first housing and the second housing receives a third touch event and generates a third detection signal based on the third touch event.

10. The wearable device of claim 6, further comprising:
    an accelerometer to provide information including at least one of position, speed, or acceleration of the device, wherein the processor determines a touch event as a user input using the information provided by the accelerometer.

11. A non-transitory processor-readable medium storing code representing instructions to be executed by a processor of a wearable device, the code comprising code to cause the processor to:
    receive, from a first housing of the device, a first detection signal generated by the first housing in response to the first housing detecting a first touch event, the first detection signal including an indication of the first touch event being received at a first time;
    receive, from a second housing of the device, a second detecting signal generated by the second housing in response to the second housing detecting a second touch event, wherein the second housing is conductively isolated from the first housing, the second detection signal including an indication of the second touch event being received at a second time;

classify, based on the first detection signal and the second detection signal, the first touch event as one of user input or inadvertent touch input, wherein the first touch event is classified as the user input in response to determining that the second time is within a predetermined duration of the first time;

responsive to classifying the first touch event as the user input, identify, based on the user input, one or more actions associated with the user input; and responsive to classifying the first touch event as the inadvertent touch input, discard the first touch event.

12. The non-transitory processor-readable medium of claim 11, the code further comprising code to cause the processor to:

classify the first touch event as the user input when the first detection signal includes an indication of the first touch event being received at a first time and the second detection signal includes an indication of the second touch event being received at a second time, the second time being substantially the same as the first time.

13. The non-transitory processor-readable medium of claim 11, the code further comprising code to cause the processor to:

classify the first touch event as the user input when the first detection signal includes an indication of the first touch event being received at a first time and the second detection signal includes an indication of the second touch event being received at a second time, the second time being within a predetermined duration of the first time.

14. The non-transitory processor-readable medium of claim 11, the code further comprising code to cause the processor to:

receiving, from one of the first housing or the second housing, a third detection signal generated by the one of the first housing or the second housing in response to the one of the first housing or the second housing detecting a third touch event.

15. The non-transitory processor-readable medium of claim 14, the code further comprising code to cause the processor to:

classify the first touch event as the user input when the first detection signal includes an indication of the first touch event being received at a first time, the second detection signal includes an indication of the second touch event being received at a second time, and the third detection signal includes an indication of the third touch event being received at a third time, the third time being within a predetermined duration of the second time.

* * * * *